US009278628B2

(12) United States Patent
Grossard et al.

(10) Patent No.: US 9,278,628 B2
(45) Date of Patent: *Mar. 8, 2016

(54) METHOD OF MANAGING THE ENERGY CONSUMED BY A MOBILE SYSTEM, IN PARTICULAR A MOTOR VEHICLE, ON-BOARD DEVICE IMPLEMENTING SUCH A METHOD

(75) Inventors: Mathieu Grossard, Montrouge (FR); Sofiene Kachroudi, Paris (FR); Neil Abroug, Clamart (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 194 days.

This patent is subject to a terminal disclaimer.

(21) Appl. No.: 14/119,837

(22) PCT Filed: May 22, 2012

(86) PCT No.: PCT/EP2012/059441
§ 371 (c)(1),
(2), (4) Date: Nov. 22, 2013

(87) PCT Pub. No.: WO2012/160045
PCT Pub. Date: Nov. 29, 2012

(65) Prior Publication Data
US 2014/0081503 A1 Mar. 20, 2014

(30) Foreign Application Priority Data

May 25, 2011 (FR) ...................................... 11 54555

(51) Int. Cl.
*B60L 15/20* (2006.01)
*B60L 1/00* (2006.01)
(Continued)

(52) U.S. Cl.
CPC ............. *B60L 15/2045* (2013.01); *B60L 1/003* (2013.01); *B60L 1/02* (2013.01); *B60L 11/1861* (2013.01);
(Continued)

(58) Field of Classification Search
CPC .. B60Y 2200/90; B60Y 2200/91; B60L 1/00; B60H 1/00385
USPC ........................................................ 701/22
See application file for complete search history.

(56) References Cited

U.S. PATENT DOCUMENTS

2011/0066308 A1 3/2011 Yang et al.

FOREIGN PATENT DOCUMENTS

EP 1462300 A1 9/2004

OTHER PUBLICATIONS

Georgia-Evangelia Katsargyri, et al., "Optimally controlling Hybrid Electric Vehicles Using Path Forecasting", 2009 American Control Conference, Jun. 10-12, 2009, pp. 4613-4617, IEEE, Piscataway, NJ, USA, XP031487056.
Harpreetsingh Banvait, et al., "Plug-In Hybrid Electric Vehicle Energy Management System Using Particle Swarm Optimization", World Electric Vehicle Journal, May 1, 2009, pp. 1-11, vol. 3, XP 009152774.

(Continued)

*Primary Examiner* — John Q Nguyen
*Assistant Examiner* — Ahshul Sood
(74) *Attorney, Agent, or Firm* — Baker & Hostetler LLP (57) ABSTRACT

A method includes trajectories of setpoints controlling a motor mechanism and auxiliary unit, the trajectory describing variation of the setpoint by position of the mobile system, the trajectories being calculated with respect to objectives according to an optimization algorithm, said method comprising:
storing an approximate profile of the route as segments of straight lines, forming positions sampled along the route, a sampled position corresponding to passage from one segment to the following segment;
sampling the profile according to a spatial pitch, forming a series of positions sampled along the route;
the trajectories being recalculated at each sampled position by the optimization algorithm, the setpoints being constant over a given segment, a simulation predicting the energy environment of the mobile system at each sampled position as a function of the setpoints and the profile of the route, the optimization algorithm taking the simulation result to calculate the setpoints.

12 Claims, 4 Drawing Sheets

(51) Int. Cl.
  *B60L 1/02*   (2006.01)
  *B60L 11/18*  (2006.01)

(52) U.S. Cl.
  CPC .......... *B60L 2240/12* (2013.01); *B60L 2240/34* (2013.01); *B60L 2240/622* (2013.01); *B60L 2240/80* (2013.01); *B60L 2260/52* (2013.01); *B60L 2260/54* (2013.01); *Y02T 10/7005* (2013.01); *Y02T 10/705* (2013.01); *Y02T 10/7044* (2013.01); *Y02T 10/7258* (2013.01); *Y02T 10/7291* (2013.01); *Y02T 90/16* (2013.01); *Y02T 90/162* (2013.01)

(56) References Cited

OTHER PUBLICATIONS

Qiuming Gong, et al., "Computationally Efficient Optimal Power Management for Plug-In Hybrid Electric Vehicles Based on Spatial-Domain Two-Scale Dynamic Programming", Proceedings of the 2008 IEEE International Conference on Vehicular Electronics and Safety, Sep. 22-24, 2008, pp. 90-95, IEEE, Piscataway, NJ, USA, XP031345339.

Qiuming Gong, et al., "Trip-Based Optimal Power Management of Plug-In Hybrid Electric Vehicles", IEEE Transaction of Vehicular Technology, Nov. 2008, pp. 3393-3401, vol. 57, No. 6, IEEE Service Center, Piscataway, NJ, USA, XP011225861.

METHOD OF MANAGING THE ENERGY CONSUMED BY A MOBILE SYSTEM, IN PARTICULAR A MOTOR VEHICLE, ON-BOARD DEVICE IMPLEMENTING SUCH A METHOD

CROSS-REFERENCE TO RELATED APPLICATIONS

This application is a National Stage of International patent application PCT/EP2012/059441, filed on May 22, 2012, which claims priority to foreign French patent application No. FR 1154555, filed on May 25, 2011, the disclosures of which are incorporated by reference in their entirety.

FIELD OF THE INVENTION

The present invention relates to a method for managing the energy consumed by a mobile system. It also relates to a device implementing such a method. It is notably applicable for electric vehicles.

BACKGROUND

Purely electrically-propelled vehicles are increasingly being used, notably in urban areas. The use of electric vehicles offers numerous advantages. The batteries are critical components for these types of vehicles. More generally, the management of the energy for these vehicles presents issues totally different from those for thermally-powered vehicles propelled by fossil fuels.

In particular, the batteries carried onboard electric vehicles have a finite energy capacity. Furthermore, the electrical recharging of a battery requires a significant amount of time. Consequently, it is essential for the driver of such a vehicle to be sure that the quantity of energy stored in the batteries is sufficient for covering a desired distance while at the same time activating the auxiliary equipment which ensures the comfort of the passengers.

For thermally-powered vehicles, the question of the management of the auxiliary equipment (heating, air conditioning, etc. . . . ) is not posed since fossil fuel is available over the road network at numerous refueling points. Thus, the strategy for management of the auxiliaries boils down to satisfying the requirements of the driver. In the case of electric vehicles, this simple strategy can quickly become unfeasible. The storage capacities are limited and the recharging points currently absent. Satisfying at any price the desired level of comfort (via the auxiliaries for heating, radio, etc.) can quickly use up the energy resources of the battery. This can happen to the detriment of the objective of the mission which is to arrive at the destination of the journey.

Coming up with a strategy for energy management taking into account the minimization of the energy consumed, the constraint of arriving at the destination and satisfying the comforts can become challenging for the driver. Indeed, these criteria can effectively impose a very slow mode of driving and the non-compliance with the speed requirements of the driver.

Numerous articles offer solutions for implementing systems for management of the energy in hybrid vehicles, with thermal engines and electric motors. These systems are furthermore called EMS, an acronym for "Energy Management Systems". The term EMS will be used henceforth.

As a general rule, these articles offer energy management strategies with the aim of finding the best scenario for activation of the thermal engine and/or electric motor at a given moment in time with regard to criteria linked to the consumption and/or pollutant emissions from a vehicle. These strategies do not allow, at the same time, the management of the satisfaction of the comfort indices of the vehicles, notably the demands from the auxiliary equipment, the electrical consumption of the battery and the performance indices of the vehicles, such as the journey time for example, in the case of a purely electrical propulsion.

Within the field of energy management for purely electrically-propelled vehicles, the patent application EP1462300 A1 may be mentioned. In this document, the aim is to allow the management of the level of charge and discharge of the battery by the driver by virtue of certain information given to the driver of the vehicle. One drawback of the solution provided is that it requires the use of a battery charger, which is a serious constraint.

SUMMARY OF THE INVENTION

One aim of the invention is notably to supply optimum setpoints that a driver, or more generally a control mechanism, must apply in order to minimize both the journey time and the energy consumption while at the same time best satisfying the demands for activation of the auxiliary equipment.

For this purpose, one subject of the invention is a method for managing the energy consumed by a mobile system, for a given route between a point of departure A and a point of arrival B, said method presenting at least one set of trajectories composed of the trajectory of a setpoint for controlling the motor mechanism and of the trajectory of a setpoint for controlling at least one auxiliary unit of equipment, the trajectory of a setpoint describing the variation of said setpoint as a function of the position of the mobile system, said trajectories being calculated with respect to given objectives according to an optimization algorithm whose variables are formed of said setpoints, said method comprising:
  a preliminary step, itself comprising:
    a sub-step for storing an approximate profile of said route in the form of segments XL of straight lines, forming a first series of positions $XL(k)$ sampled all along the route, a sampled position $XL(k)$ corresponding to the passage from one segment to the following segment;
    a sub-step for sampling said profile according to a spatial pitch Xe, forming a second series of positions sampled $Xe(j)$ all along the route;
  the trajectories being recalculated at each sampled position $XL(k)$ of the first series according to the optimization algorithm, the setpoints being constant over a given segment XL, a simulation predicting the energy environment of the mobile system up to the point of arrival B being carried out at each sampled position $Xe(j)$ of the second series as a function of said setpoints and at least of the approximate profile of the remaining part of the route, the optimization algorithm taking into account the result of the simulation for calculating the setpoints of the trajectories.

In one possible embodiment, the optimization algorithm is a particle swarm meta-heuristic procedure, a particle being composed of said setpoints.

The segments of the approximate profile depend for example on the elevation of the route, a segment representing a section of route with a constant slope.

The predicted energy environment comprises for example at least the state of the energy resource.

In one particular embodiment, the mobile system is a vehicle, and the setpoint for controlling the motor mechanism is the motor torque demand for said vehicle. In this case, the energy environment can furthermore comprise the speed of the vehicle, the remaining journey time and at least one output variable from an auxiliary unit of equipment.

The simulation is for example also carried out as a function of the traffic conditions over the remaining part of the route.

Since several given objectives are each composed of a combination of one or more objectives taken from within a set of objectives O1, O2, O3, several sets of trajectories can be presented, a trajectory being calculated with respect to a combination of objectives.

Since the vehicle uses electrical energy, the energy resource being from electrical batteries, the combinations of objectives are created from amongst the following objectives O1, O2, O3:

O1: minimize the total electrical charge consumed by the batteries, charge transmitted to the electric motor and energy transmitted to the auxiliary equipment;

O2: minimize the journey time between the point of departure A and the point of arrival B;

O3: minimize the difference between the requested output from the auxiliary equipment and the actual output of said equipment.

The setpoints defined by the trajectories can be presented to the driver of the vehicle in the form of visual or vocal instructions.

Another subject of the invention is a device for managing the energy consumed by a mobile system. The device is designed to be installed onboard a mobile system, and comprises at least one computer, means for sensing the positions of said system, sensors for measuring the state of the energy resource of said system, and sensors providing output information for the auxiliary equipment, said means and said sensors being interfaced to the computer, the computer implementing the method such as previously described.

BRIEF DESCRIPTION OF THE DRAWINGS

Other features and advantages of the invention will become apparent with the aid of the description that follows presented with regard to the appended drawings, which show.

DETAILED DESCRIPTION

Figure 1:
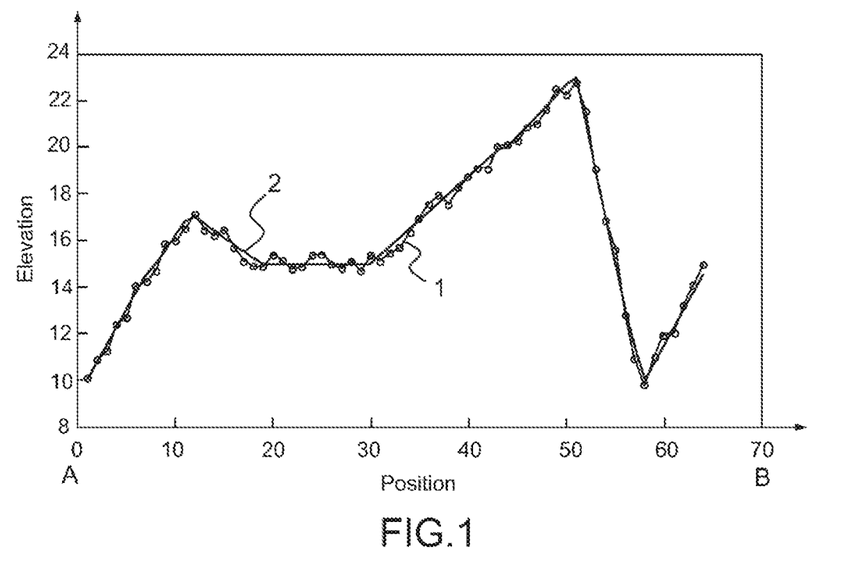
FIG. 1, the actual profile of one example of a route to be traveled by a vehicle, and its approximate profile.

FIG. 1 shows the profile of one example of a route to be traveled by a vehicle, between a point of departure A and a point of arrival B. In particular, it shows the elevation of the route as a function of the position of a vehicle all along this route. The actual profile 1 of the route is approximated by a linear function 2 by a set of segments.

The invention is described for application to a vehicle, however it is applicable to all types of mobile systems traveling over a given route. The invention is advantageously applicable to a mobile system driven by a single source of energy. Thus, the invention can be applicable to a vehicle entirely electrically propelled by means of a battery supplying the energy by itself to the driving electric motor.

The implementation of the invention requires the use of an electronic computer inside the vehicle capable of collecting, via a communications protocol of the CAN type for example, a set of signals representative of the level of charge of the battery, of the forward speed of the vehicle, and of the level of use notably of the auxiliary equipment. This computer has an onboard simulator for the vehicle in order to be able to predict the consumption of energy over the route. The invention also uses for example a GPS which will provide road information in advance on the inclination of the route. The knowledge from the GPS of information on road traffic may furthermore be used to advantage.

In the following part of the description, the heating is considered by way of example as the only auxiliary equipment in the vehicle. Other auxiliaries could be taken into account, in particular the audio system, the air conditioning or the interior lighting equipment for example. Generally speaking, the invention takes into account at least the electric motor and the whole of the drive chain of the vehicle, together with at least one auxiliary unit of equipment for comfort.

In the example that follows, two control variables X, or setpoints, are therefore chosen upon which the driver can act:
the torque requested from the motor;
the requested position of the heating.

In the electric vehicle in question, energy can be recovered during braking phases. Thus, the motor torque requested may be positive, for the case of propulsion, or negative, for the case of deceleration. The torque variable is for example expressed as a percentage of its maximum permitted value. The heating position variable is an integer variable; each position corresponds to a fixed power for heating the passenger compartment of the vehicle.

Within the framework of the invention, the trajectory of a variable X corresponds to the variation of this variable as a function of the position, from the point of departure A up to the point of arrival B. Thus, the trajectory of the motor torque is the value of the torque supplied by the motor at each position on the route. The trajectories are therefore described with respect to a spatial reference rather than a time reference, in particular for the following two reasons:

there is prior knowledge of the route via position coordinates from GPS information, the time of arrival being unknown and constituting an optimization parameter;

certain variables of the model of the vehicle for the simulation depend on the position or on the elevation, for example the torque requested essentially varies with the elevation.

The two variables, requested motor torque and requested heating position, are calculated over the whole route. For this purpose, the route is sampled according to a spatial period Xe, tests being carried out at each of the sampled positions according to a management algorithm, one example of which will be described in the following part. It should be noted that a large number of samples may be considered over a relatively long route. By way of example, Xe can be taken as equal to 10 meters.

It is however possible to apply a simplification by introducing a second category of spatial samples XL, the samples XL being for example defined by the segments 2 approximating the profile of the trajectory, each segment corresponding to a sample XL. These samples XL correspond to the refreshment steps of the setpoints. Indeed, over a route segment with fixed slope under conditions of stationary traffic, a typical driver requests to a first approximation the same motor torque setpoint over the whole of this segment, corresponding to one sample XL. The actual variations of the torque around this average setpoint may be omitted over such a route segment. Furthermore, a driver changes the heating request setpoint with a more restricted number of spatial steps than the steps Xe.

One overall objective of the energy management strategy within a vehicle is to determine the optimum values of these two variables over the whole of the route sampled, with regard for example to three following objectives O1, O2, O3:

O1: minimize the total electrical charge consumed by batteries or any other type of energy resource, charge transmitted to the electric motor and energy transmitted to the heating;

O2: minimize the journey time between the point of departure and the point of arrival;

O3: minimize the difference between the passenger compartment temperature requested by the driver and the actual temperature in the passenger compartment under the action of the heating system.

For auxiliary equipment other than the heating, the objective O3 may be formulated as follows:

O3: minimize the difference between the requested output of the auxiliary equipment and the actual output of said equipment.

In addition to these objectives, the management strategy must satisfy several constraints, amongst which are for example the following constraints C1, C2, C3, C4:

C1: the instantaneous charge of the batteries must always be higher than a fixed threshold, in order to preserve the lifetime of the batteries;

C2: the journey time must be longer than a fixed threshold;

C3: the difference between requested and actual temperature must not exceed a fixed threshold;

C4: the speed of the vehicle must not exceed a certain threshold, in order to comply with the speed limits all along the route.

It should be noted that, in the case of a thermally-powered vehicle, the last two objectives can easily be met since the energy reservoir has an infinite capacity, and has fast and available recharging with fuel. In the case of an electric vehicle, these two objectives are no longer as easily met. The management strategy implementing the invention notably applies a trade-off between these contradictory objectives while at the same time complying with the aforementioned constraints.

Between a point of departure A and a point of arrival B, the set of trajectories in question are the mechanical torque supplied by the motor and the heating position, together for example with the state of charge of the batteries, the speed of the vehicle, the journey time and the temperature of the passenger compartment. The trajectory of each of these sets of information can be represented by a curve showing their value as a function of the position of the vehicle all along the route between the point A and the point B.

One objective of the energy management strategy according to the invention is to supply three sets of trajectories between the points A and B; one set of low trajectories, one set of high trajectories and one set of trajectories referred to as pseudo-optimum, where these trajectories may be defined as follows:

Low trajectories: these trajectories are obtained by taking into account objectives O1 and O3; the term "low" is used because the speed of the vehicle which results from this optimization is theoretically lower than that obtained by considering the other sets of objectives;

High trajectories: these trajectories are obtained only taking into account the objectives O2 and O3; in these trajectories the speed of the vehicle should be higher than that obtained by the low trajectories;

Pseudo-optimum trajectories: these are the trajectories obtained by taking into account the three objectives O1, O2, O3 simultaneously.

Preferably, these trajectories are suggested to the driver of the vehicle in a given ergonomic form. The driver then still has the possibility of deciding to accelerate or to brake, and of changing the heating power setpoint. The three sets of trajectories are notably used to assist the driver and to reassure him/her on the possibility of arriving at the destination of his/her route with the stored quantity of electrical energy. The invention allows the optimum trajectories to be suggested to the driver according to his/her preferences and his/her mode of driving for example.

Figure 2:
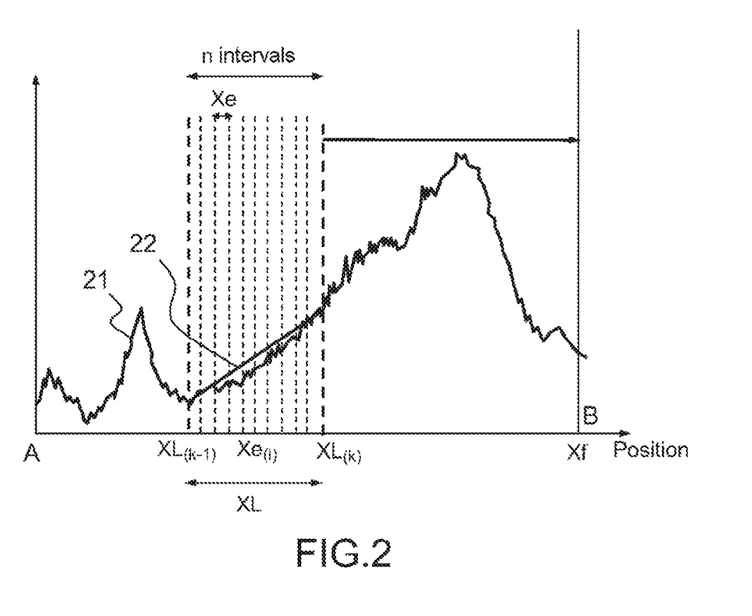
FIG. 2, an illustration of examples of spatial sampling all along the approximate route.

FIG. 2 illustrates the spatial samplings Xe and XL previously defined for a given route profile represented by a curve 21. The samples Xe are shown inside a segment 22 framed by two values of samples XL.

At the point of departure A, the three sets of trajectories are calculated and determined according to the known information on the route. These trajectories are updated at particular points corresponding to the times of spatial samplings. At an update point, the three sets of trajectories are recalculated based on the previous history, on the remaining part of the route profile, on the external temperature and on the measurements collected at this point. These measurements indicate for example the state of charge of the batteries, the temperature of the passenger compartment and the journey time up to this point. The previous history notably comprises the recordings of the trajectories calculated at the preceding sampling times.

The calculation of the optimum trajectories is performed based on a formalization of the problem of EMS management as a problem of single-objective optimization with constraints containing several decision variables.

Reference is now made to FIG. 2. At the k-th update point of the journey, sampled position XL(k) of the series XL, the objective is to determine the optimum trajectories up to the final position Xf. The preceding update took place at the point X(k−1), the points X(k−1) and X(k) framing a segment 22. In the example in FIG. 2, two consecutive segments are not collinear, which in practice means that the passage from one segment to the other occurs at a change of inclination of the slope of the route. Cases could however be envisioned where two consecutive segments are collinear, with no change of inclination, for example in the case where a segment is too long, it may be subdivided. Within the segments, up to the final position Xf, the route is sampled according to the pitch Xe.

For the update at the point XL(k), a segment break point, the torques requested from the motor are to be determined, for both propulsion and braking, together with the setpoint positions for the heating, up to the final position Xf at the point B. These variables, torque and heating position, are determined in such a manner as to minimize a criterion involving the three objectives O1, O2 and O3 of the preceding section 22 X(k−1), X(k), and complying with the four constraints C1, C2, C3 and C4.

Figure 3:
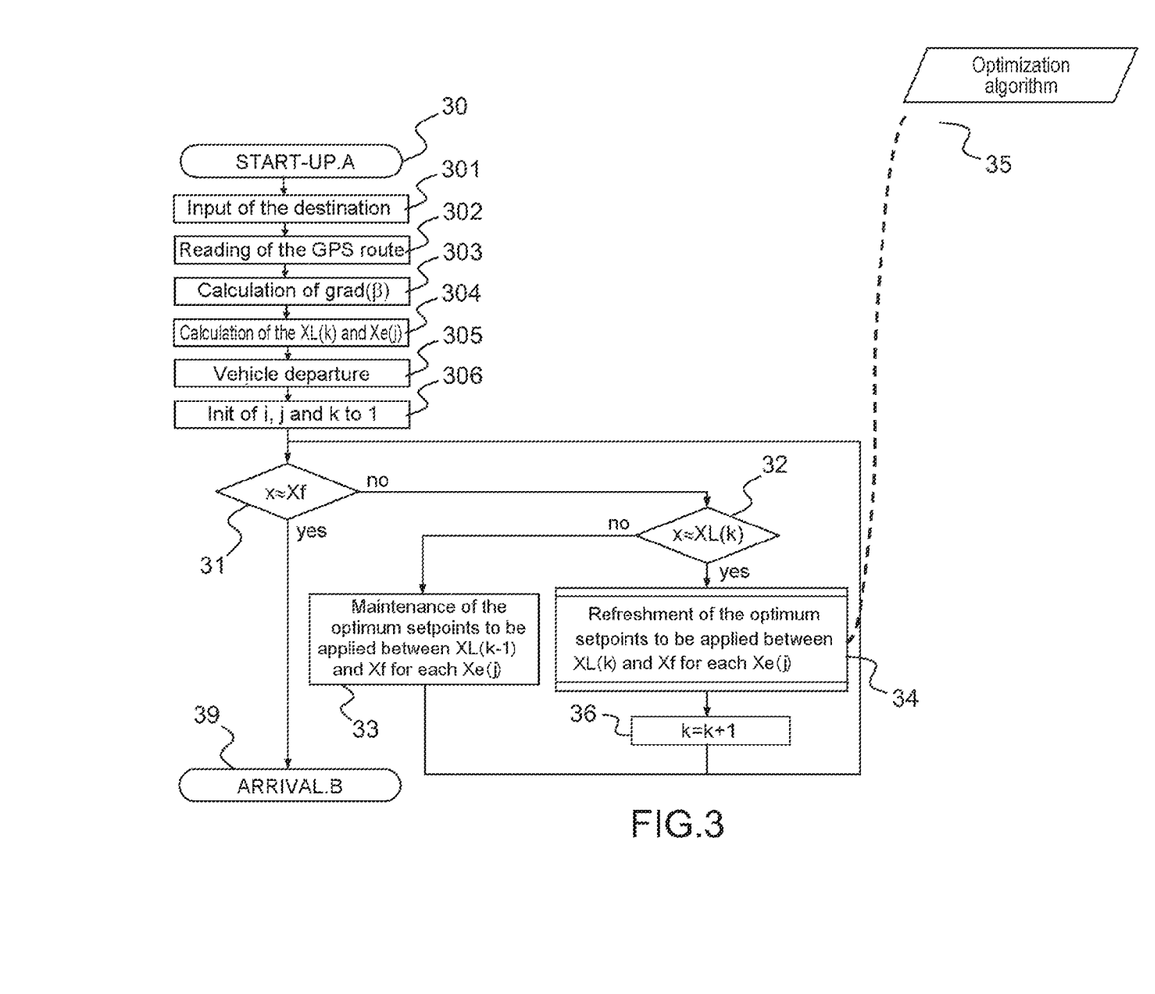
FIG. 3, a flow diagram of one example of a general algorithm implementing an energy management method according to the invention.

FIG. 3 shows the flow diagram of one example of a general algorithm implementing one example of an EMS strategy according to the invention from the starting of the vehicle at a point A up to an arrival point B, the final destination. Upon starting 30, in a preliminary step, at the point A, several operations are performed:

301, input of the geographical coordinates of the destination;

302, reading of the route by the GPS device; the profile of the route may be approximated during this step;

303, calculation of the temperature gradient over the route according to available meteorological information;

304, determination of the two series of sampled positions XL and Xe starting from the approximate profile 2, such as illustrated for example in FIG. 1;

305, start command for the vehicle resulting notably in the activation of the motor torque;

306 resetting of the indices i, j and k to 1, which indices respectively correspond to a time step Te for sampling all along the route, with the spatial sampling pitch Xe, and with the spatial sampling pitch XL for update of the optimum setpoints.

The algorithm begins and then continues with a series of two tests 31, 32. These tests are carried out at the rate of the sampling time step Te; in other words these tests are performed after every time Te. X(i) denotes a sampled position depending on Te.

In a first test 31, the position X(i) is compared with the final value Xf. When the value X(i) is substantially equal to the value Xf, furthermore stored in memory, the vehicle has reached the point of arrival B, and is at its final destination 39. In the opposite case, the position X(i) is compared, in a second test 32, with a sampled position XL(k) for change of setpoint. If the value X(i) is not equal to XL(k), the optimum setpoints to be applied between the point XL(k−1) and the final point Xf are maintained 33 for all the positions Xe(j). If the value X(i) is substantially equal to XL(k), the refreshment of the optimum setpoints is applied for each position Xe(j) between the position XL(k) and Xf 34. The position XL(k) is incremented by a step XL, to XL(k+1) for the next test 32. After this test, following which the setpoints are kept the same 33 or refreshed 34, the algorithm is looped back to the first test 31 where the step X(i+1) is compared with the position Xf, then if Xf has not been reached, X(i+1) is compared with XL(k) or XL(k+1) depending on whether XL has been incremented or not.

Since the positions X(i) and XL(k) do not necessarily coincide, an interval of distance Lε E is defined such that |XL(k)−X(i)|<Lε signifies that the position XL(k) has been reached. The same applies to Xf. The positions of the vehicle are detected by position sensors, for example by means of a GPS system, the distance Lε taking into account the uncertainties in measurements.

The refreshment, or update, of the setpoints is for example carried out by an optimization algorithm 35.

The optimization algorithm chosen for example uses a particle swarm method. It is of course possible to use other meta-heuristic methods such as genetic algorithms or 'ant colony' algorithms for example. The problem of optimization may be formulated by the minimization of a single-objective function with constraints. The single-objective function is the weighted sum of the objectives O1, O2, O3. This problem is thus formulated in the following table for a position X(i), denoted $X_i$, coinciding with a position XL(k):

$$\text{minimize} \begin{cases} \alpha \times O1(Cp, Pc, \text{State\_i, Param\_route}) + \\ \beta \times O2(Cp, \text{State\_Param\_route}) + \\ \gamma \times O3(Pc, \text{State\_i, Param\_route}) \end{cases}$$

where $$\begin{cases} \alpha, \beta \text{ and } \gamma: \text{ weighting coefficients} \\ Cp: \text{ torque requested from the motor from } X_i \text{ up to } X_f \\ \begin{pmatrix} \text{percentage of the torques of maximum} \\ \text{propulsion and of maximum braking} \end{pmatrix} \\ Pc: \text{ position of the heating from } X_i \text{ up to } X_f \text{(integer)} \\ \text{State\_i: state of the vehicle} \begin{pmatrix} \text{battery charge, passenger compartment} \\ \text{temperature, vehicle speed, etc ...} \end{pmatrix} \end{cases}$$

Param_route: parameters relating to the
    route(length, route profile, outside temperature, etc ...)

under the following constraints:

$$\begin{cases} -1 \le Cp \le 1 \\ 0 \le Pc \le nPcMax \\ \text{State\_min} \le \text{State} \le \text{State\_max} \end{cases}$$

where

State_min and State_max:
    minimum and maximum state of the vehicle nPcMax: maximum power requested from the heating In the table hereinabove, n corresponds to a discrete position of the heating setpoint. The torque Cp is normalized and varies between −1, for the minimum braking torque, and +1, for the maximum propulsion torque.

It should be noted that the passage from one optimum trajectory to another is carried out by differently weighting the objective function to be minimized according to the values α, β, γ.

This optimization problem is single-objective with constraints with a very large search space. It must furthermore simultaneously take into account variables with real values, such as the value of the requested motor torque, and integer values, such as the heating position.

Figure 4:
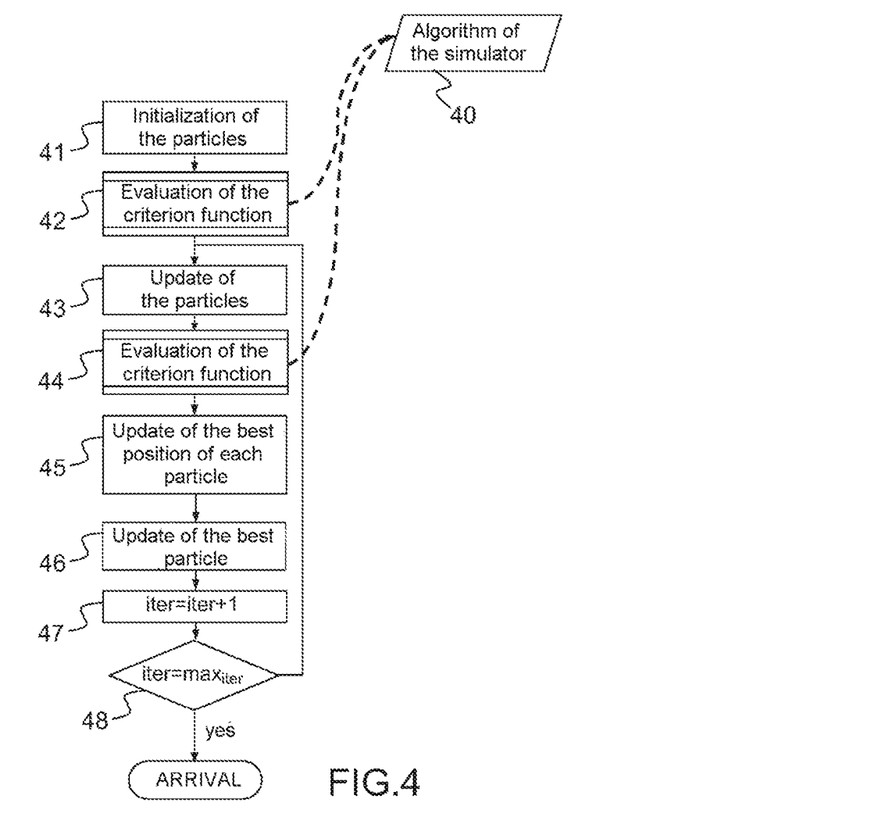
FIG. 4, one example of an optimization algorithm.

This problem of optimization may be difficult to solve by standard optimization techniques. The use of a meta-heuristic method allows the difficulty to be overcome. The particle swarm optimization algorithm, an iterative algorithm 36, notably has the advantage of being simple to implement in a computer onboard a vehicle. It is a method based on the existence of a population of particles, corresponding to the solutions, which move around within the search space of the admissible solutions. Each particle has a memory which allows it to return to its best position, according to the optimization criterion. It also has access to the best positions of its neighbors. The particle has a flight plan which allows it to be aware of its future destination within the search space. This flight plan is calculated based on its best position in the past, the best position of the all of the particles and its last velocity vector, referred to loosely as its speed. In the present invention, a particle corresponds to a set of the variables relating to the state of the system. In the present example, a particle corresponds to the requested motor torque Cp and to the heating position n. For example, a particle corresponds to:

Cp=10% of the maximum torque;

n=4.

The future position of a particle i is determined by means of the two equations presented in the following table:

$$\begin{cases} V_i(t+1) = \omega \times V_i(t) + c_1 \times r_1 \times \\ \qquad (P_i(t) - P_i^{best}(t)) + c_2 \times r_2 \times (P_i(t) - P_{glob}^{best}(t)) \\ P_i(t+1) = P_i(t) + \chi \times V_i(t+1) \end{cases} \quad \text{Eq 1}$$

where $V_i(t)$: speed vector or displacement at the iteration $t$ $P_i(t)$: position vector at the iteration $t$ $P_i^{best}(t)$: best position vector of the particle $i$ $P_{glob}^{best}(t)$: best position vector of all the particles $r_1, r_2$: random number between 0 and 1

$\omega, c_1, c_2, \chi$: adjustment parameters for the algorithm

In order to render this meta-heuristic procedure more robust and to guarantee a convergence toward the global optimum, the following operations may be carried out:
 deterministic or random dynamic variation of certain parameters of the algorithm;
 limitation of the velocity vector in order to prevent travel distances being too large, which may have the tendency to make the particles go outside of the domain of the admissible solutions, or to confine them to the boundaries of the search space;
 introduction of the mutation operator, already used in the genetic algorithms, in order to avoid the stagnation of the particles or a premature convergence toward a local optimum.

For the integer variables, such as the heating positions, a simple method consists in relaxing the integer value constraint by allowing the use of real variables. In order to go from these variables to the evaluation via a simulation model, the real value is approximated by the nearest integer.

FIG. 4 shows the optimization algorithm where the steps previously described can notably be seen. All the particles, or solutions, are evaluated with respect to the criterion to be minimized—optimization—and to the constraints. This criterion and these constraints make use of a simulator for the vehicle, having its own algorithm 40 capable of determining the state of the system from a position X(i) to a position Xf. The use of the simulator within the optimization algorithm is notably illustrated in FIG. 4. In an initial step 41, the initialization of the particles is carried out. This step is followed by a step 42 for evaluation of the initialized particles, according to the optimization criterion and the constraints, by means of the simulator 40. This step is followed by a step 43 for updating the particles according to the preceding system of equations (Eq1). It is followed by an evaluation step 44. This step performs the evaluation of the new particles according to the optimization criterion and according to the constraints, by means of the simulator 40. This evaluation step is followed by a step 45 for updating the best position of each particle, itself followed by a step 46 for updating the best particle of the swarm. After this step 46, the next iteration 47 is carried out by looping back to the particle update step 43. When the maximum iteration is reached 48, the algorithm stops.

Figure 5:
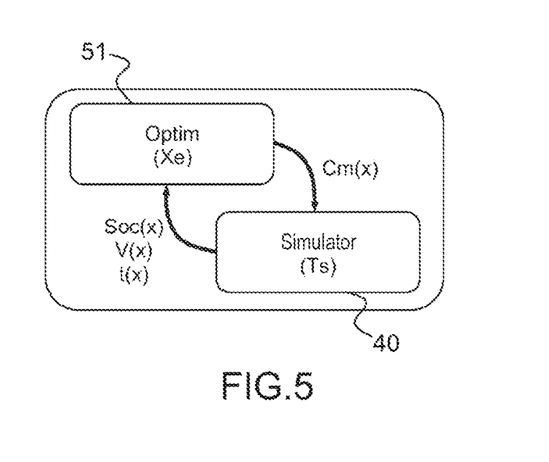
FIG. 5, one illustration of the cooperation between the optimization algorithm and a simulation of the state of a vehicle over a route remaining to be traveled.

FIG. 5 illustrates the cooperation between the meta-heuristic procedure 51, corresponding for example to the optimization algorithm in FIG. 4, and the simulator 40.

The role of the simulator 40 is notably to predict the energy consumptions of the drive chain and of the heating, and more generally of all the auxiliaries, over the remaining part of the journey. This simulator is intended to be called upon as many times as there are particles at each iteration of the particle swarm algorithm. The total number of calls to the simulator can thus reach a few thousand for a given scenario. The cycle time of the simulation must be compatible with the various sampling parameters. For the sake of simplification, the modeling can be limited as a first approximation to the behavior of the vehicle and of only those devices consuming the major part of the energy from the batteries, in other words the electric traction motor and the heating. In a more general context taking into account other auxiliaries, the energy consumed by the latter may be neglected.

In the following paragraphs, the synthesis of a simulator for the drive chain is considered. For the analytical expression of the model of the vehicle, the following simplifying assumptions are made:
 Longitudinal dynamics: An exhaustive modeling of the drive chain of a vehicle takes into account the 6 degrees of freedom of the vehicle and decouples the dynamic behavior of the vehicle from that of the 4 wheels. This leads to a differential equation of 10th degree. In order to simplify the model so as to install it in a vehicle computer EGV, only the longitudinal dynamic behavior of the vehicle is modeled.
 Zero slippage on the road: The distinction between the dynamics of the vehicle and of the wheels (taking into account the wheel-road slippage) is only relevant if there is a need to model the ABS.
 Negligence of the dynamics of the motor: In view of the very short response time of the motor with respect to the dynamic behavior of the vehicle, the dynamic behavior of the motor is not modeled. Since the motor is closed-loop controlled in torque, the motor torque is virtually equal to the setpoint torque.

In view of the preceding simplifying assumptions, 4 sub-systems of the drive chain may be identified:
 The motor and its variator
 The mechanical transmission
 The longitudinal dynamic behavior of the vehicle
 A model of the battery As far as the equations governing these various sub-systems are concerned:

Servomotor: The power losses of an asynchronous motor are not stationary, they depend on the motor torque and speed. A static mapping represents the motor behavior and its efficiency. This allows the electrical power consumed by the motor to be identified at each moment in time.

Mechanical transmission: The transmission is modeled by a gain in speed corresponding to the ratio denoted N of the motor (rd/s) and vehicle (m/s) speeds, and a gain in torque, being the ratio of the motor torque (N·m) and vehicle acceleration force (N). The gain in acceleration force and the gain in speed are assumed to be identical, the losses being modeled in the motor.

Dynamics of the vehicle: Because of the reduction of the dynamics of the vehicle to only its longitudinal component without slippage, the latter may be described by the following first-order non-linear differential equation (quadratic dynamic behavior):

$$M\ddot{X} \pm F_t - f_s \cos(\beta)\text{sign}(\dot{X}) - f_{aero}\dot{X}|\dot{X}| - Mg\sin(\beta)$$

with:

M: Sum of the mass of the vehicle and of the rotational inertias (motor, transmission, wheels) modeled as a total translational mass $F_t$: Tractional or braking force depending on the sign $f_s$: Dry frictional torque
$f_{aero}$: Aerodynamic coefficient of resistance
β: Slope of the road at the current time It should be noted that the braking force is due only to the motor braking effect and corresponds to a negative torque setpoint, whereas the tractional force corresponds to a positive setpoint.

Battery: The state of charge of the battery, also referred to as SOC, is the difference between the total energy stored and the energy consumed by the various devices that are connected to it:

$$SOC(t) = E_0 - \int IU dt$$

where I(t) is the current flowing in the motor, and U(t) is the voltage across the terminals of the motor, and $E_0$ is a function notably of the temperature. However, initially, it can be considered as constant while reserving the possibility of introducing the property $E_0 = f(T°)$ later on.

When the equations of the various equations governing the sub-systems are established, the parameters for the models of these sub-systems are set.

Motor: By way of example, an asynchronous motor ABM with a power of around 15 kW is considered. A series of measurements allows a mapping of the power losses as a function of the speed and of the torque of the motor to be provided. This mapping takes the form of a 3D surface which is a function of the speed and of the torque of the motor; it is digitized and stored in the system. In order to reduce the processing time, the mapping may be interpolated in the form of polynomial equations in order to describe the 3D surface.

Mechanical transmission: the following ratio parameter N:

$$N = \frac{ForceTraction}{MotorTorque} = \frac{MotorSpeed}{VehicleSpeed}$$

defines the gain in transmission and corresponds to the ratio of the gain of the reducer divided by the radius of the driving wheel.

Dynamics of the Vehicle:

$$Mass: M = M_{empty} + M_{PackBatteries} + M_{Payload} = 500 + 140 + 200 = 840/kg$$

$$\text{Coefficient of dry friction}: f_s = 0.3$$

$$\text{Aerodynamic coefficient}: f_{aero} = C_x S = 0.3 \times 1.5 = 0.45 \; N \cdot m^{-2} \cdot s^2$$

Battery: The chosen battery is for example composed of 10 cells of 1.766 KWh each, giving $E_0 = 10 \times 1.766 = 17.66$ kWh = 63576 Megajoules.

Returning to FIG. 5, the output of the modulator 40 forms an input for the optimization algorithm 51 in the sense that the simulator calculates a state of the system (notably, speed V(x), temperature t(x), SOC(x)) for the positions X(i) sampled up to Xf; this state represents the energy environment of the vehicle. This state is used for the evaluation of the updated particles. Similarly, the output of the optimization algorithm forms an input of the simulator in the sense that the algorithm supplies the optimum motor torque and heating position to the simulator in order to perform the simulation of the vehicle, this state (motor torque, heating position) being defined in the step 46 for updating the best particle. In applications taking into account auxiliary equipment other than the heating, this state or energy environment would take into account the output variable from this equipment, the audio volume of an autoradio or the output temperature of an air conditioning unit for example. The simulation is also performed as a function of the traffic conditions over the remaining part of the route, such as the climatic conditions or the intensity of the road traffic.

The behavior of the vehicle is governed by non-linear differential equations in the time domain. These time-dependent equations are sampled according to a simulation time step Ts prior to carrying out their numerical integration. Ts is for example of the order of 2 seconds. For its part, the particle swarm optimization algorithm samples the various states (couple, speed and SOC notably) with the spatial pitch Xe, the setpoints being refreshed at the rate of the samples XL. The meta-heuristic method 51 and the simulator 40 exchange input and output data. The same states are therefore expressed in two different spaces, temporal and spatial. It is necessary for the inputs/outputs of a module 51 to be compatible with the inputs/outputs of the other module 40.

The passage of data expressed in the temporal space to a spatial space does not pose a particular problem. After having obtained all the states in the time domain, the position vector is available as a function of the time, the correspondence between the spatial and temporal information then being defined. The various values of the state vectors calculated at the successive times are thus interpolated as a function of the position Xe(j).

The inverse passage, from the spatial space to the temporal space, is needed in order to determine the torque and heating setpoint to be considered at each time iteration of the simulator. The assumption is that at time zero, the position is also zero, Cm(x=0)=Cm(t=0), Cm being the motor torque. At each iteration, the new position of the vehicle is calculated and compared with the spatial samples corresponding to changes of setpoints. In the case where there is a correspondence, the setpoint torque for the next time iteration of the simulator is re-estimated by applying the torque corresponding to this critical position in the setpoint vector c=f(x).

Since the objective of the simulator is to estimate the speeds and SOC on a trajectory whose final position is known, the output condition of the simulator is spatial rather than temporal. It should be noted that, in certain atypical cases envisioned by the stochastic optimization method, the vehicle might not reach the destination, and it is therefore necessary to add an output condition in respect of a maximum number of iterations.

Figure 6:
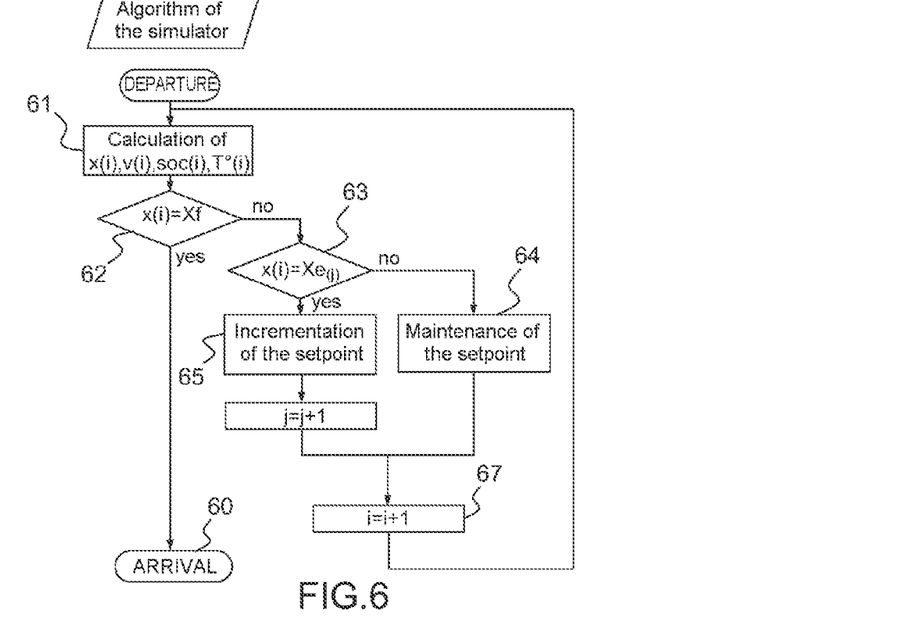
FIG. 6, one example of a simulation algorithm.

FIG. 6 presents the operational algorithm of the simulator 40 according to the preceding description. In particular, at the moment of time-domain sampling of order i, the simulator calculates, in a first step 61, the position X(i) of the vehicle, the speed V(i) of the vehicle, the state of charge of the batteries SOC(i) and the temperature T° (i) inside the passenger compartment, by means of sensors known to those skilled in the art. The data V(i), SOC(i) and T° (i) are transmitted to the optimization algorithm.

X(i) is subsequently compared 62 with Xf in order to determine whether the vehicle has arrived at its destination 60. If this is not the case, X(i) is compared 63 with the next sampled position Xe(j). If X(i) is different from Xe(j), the setpoint is maintained 64. In the opposite case, X(i) is substantially equal to Xe(j), the setpoint is incremented 65 and is maintained until the next spatial step. The index j is then incremented by one unit 1 such that the next comparison 63 will be made with Xe(j+1). At the next moment of time-domain sampling 67, the method loops back to the first step 61 for calculating the position, the speed, the state of charge and of temperature, i.e. X(i+1), V(i+1), SOC(i+1) and T° (i+1).

The period of time-domain sampling is the sampling period previously mentioned, and it may be equal to the period Te used for the general algorithm presented in FIG. 3.

Figure 7:
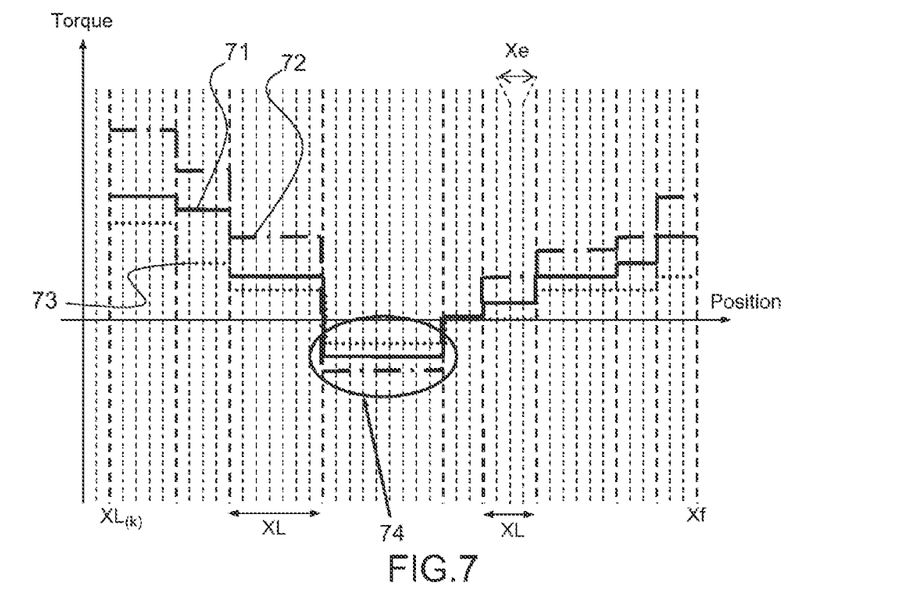
FIG. 7, one example of a result of energy management according to the invention in the form of the presentation of three trajectories, giving setpoints to be applied.

FIG. 7 presents one example of a final result of the optimization strategy at a given moment in time or at a given position, in this example at the position XL(k). This result shows the three optimum trajectories, the mean trajectory 71, the high trajectory 72 and the low trajectory 73. These trajectories represent the value of the motor torque demand as a function of the position. The values of the torques 74 are constant over the segments 22 whose pitch XL is variable, given that these segments do not all have the same length. They indeed correspond for example to sections with constant slope as previously indicated. Within these segments, the torque setpoint is therefore constant. Each trajectory predicts the optimum values of torques from the position XL(k) up to the end of the trajectory at the position Xf. They are calculated so as to minimize the energy consumption, the travel time and/or to allow the maximum comfort by means of the strategy implemented by the method according to the invention, such as previously described, depending on the objectives fixed at the start and on the constraints associated with the route.

These three sets of trajectories are presented to the driver for him/her to adapt his/her mode of driving. Preferably, they are not presented in a raw form such as illustrated in FIG. 7. They can be presented in an ergonomic form adapted to the situation of an automobile driver, for example in the form of vocal or visual instructions, simple to read in the visual case.

The algorithms implementing the method according to the invention are for example implemented in a computer onboard the vehicle, this computer being interfaced with the various sensors supplying the necessary input data such as notably the positions, the speed or else the inside and outside temperatures for example, together with the measurements of the state of the batteries.

The invention has been described for an automobile vehicle taking into account only one auxiliary system. It may be applied to the operation of a driverless vehicle. The recommendations or suggestions to the driver for driving and for controlling the auxiliary systems coming from the trajectories in FIG. 7 are then used as command signals for mechanisms controlling the motor torque and the auxiliary systems. Interfaces between the onboard computer and the various control mechanisms then need to be provided.

The invention is also suitable for managing the energy of robots, the latter having a battery as source of energy. In this case, one example of an auxiliary is the control of a member of the robot, notably an arm, to be added to the main control intended for the movement of the robot.

The invention claimed is:

1. A method for managing an energy consumed by a mobile system, for a given route between a point of departure A and a point of arrival B, the method including at least one set of trajectories composed of a trajectory of a setpoint for controlling a motor mechanism and of a trajectory of a setpoint for controlling at least one piece of auxiliary equipment, the trajectory of a setpoint describing a variation of said setpoint as a function of a position of the mobile system, said trajectories being calculated with respect to given objectives according to an optimization algorithm whose variables are formed from said setpoints, said method comprising:
  a preliminary step, itself comprising:
    a sub-step for storing in a memory of a computer an approximate profile for said route in the form of segments XL of straight lines, forming a first series of positions XL(k) sampled all along the route, a sampled position XL(k) corresponding to the passage from one segment to the following segment;
    a sub-step for sampling of said profile with the computer according to a spatial pitch Xe, forming a second series of positions sampled Xe(j) all along the route, the sampled positions Xe(j) being situated within the segments XL; and
  recalculating with the computer the trajectories of said setpoints at each sampled position XL(k) of the first series according to the optimization algorithm, the setpoints being constant over a given segment XL, a simulation predicting the energy environment of the mobile system up to the point of arrival B being carried out with the computer at each sampled position Xe(j) of the second series as a function of said setpoints and at least of the approximate profile of the remaining part of the route, the optimization algorithm taking into account a result of the simulation for calculating the setpoints of the trajectories; and outputting, from the computer to either an operator or a control mechanism of the mobile system, the setpoints for operation of the mobile system.

2. The method as claimed in claim 1, wherein the mobile system is driven by a single source of energy.

3. The method as claimed in claim 1, wherein the optimization algorithm is a particle swarm meta-heuristic procedure, a particle being composed of said setpoints.

4. The method as claimed in claim 1, wherein the segments of the approximate profile depend on the elevation of the route, a segment representing a route section with constant slope.

5. The method as claimed in claim 1, wherein the predicted energy environment comprises at least the state of an energy resource.

6. The method as claimed in claim 1, wherein, the mobile system being a vehicle, the setpoint for controlling the motor mechanism is the motor torque requested from said vehicle.

7. The method as claimed in claim 6, wherein the energy environment comprises the speed of the vehicle, the remaining journey time and at least one output variable from an auxiliary piece of equipment.

8. The method as claimed in claim 6, wherein the simulation is furthermore carried out as a function of the traffic conditions over the remaining part of the route.

9. The method as claimed in claim 6, wherein the setpoints defined by the trajectories are presented to the driver of the vehicle in the form of visual or vocal instructions.

10. The method as claimed in claim 1, wherein several given objectives being each composed of a combination of one or more objectives taken from within a set of objectives (O1, O2, O3), several sets of trajectories are presented, a trajectory being calculated with respect to a combination of objectives.

11. The method as claimed in claim 10, wherein the vehicle using electrical energy and an energy resource being electrical batteries, the combinations of objectives are created from amongst the following objectives O1, O2, O3:
  O1: minimize the total electrical charge consumed by the batteries, charge transmitted to an electric motor and energy transmitted to the auxiliary equipment;
  O2: minimize the journey time between the point of departure A and the point of arrival B;
  O3: minimize the difference between the requested output of the auxiliary equipment and the actual output of said equipment.

12. A device for managing the energy consumed by a mobile system, wherein said device is capable of being carried onboard a mobile system, said device comprising at least one computer, means for sensing the positions of said system, sensors for measuring the state of the energy resource of said system, and sensors providing output information for the auxiliary equipment, said means and said sensors being interfaced to the computer, the computer implementing the method as claimed in claim 1.

* * * * *